United States Patent [19]
Roehrdanz et al.

[11] Patent Number: 5,887,820
[45] Date of Patent: Mar. 30, 1999

[54] WHEEL-TYPE LANDING GEAR FOR HELICOPTERS

[75] Inventors: Juergen Roehrdanz, Riedering; Wolfgang Fischer, Munich, both of Germany

[73] Assignee: Daimler-Benz AG, Munich, Germany

[21] Appl. No.: 8,809

[22] Filed: Jan. 20, 1998

[30] Foreign Application Priority Data

Jan. 17, 1997 [DE] Germany .................. 197 01 404.6

[51] Int. Cl.⁶ .................................................. B64C 25/06

[52] U.S. Cl. ................................. 244/17.17; 244/100 R

[58] Field of Search ................ 244/17.11, 17.17, 244/100 R, 108, 129.6

[56] References Cited

U.S. PATENT DOCUMENTS

| | | | |
|---|---|---|---|
| 2,933,270 | 4/1960 | Maltby | 244/17.17 |
| 3,904,155 | 9/1975 | Chavis | 244/129.6 |
| 4,270,711 | 6/1981 | Cresap et al. | 244/17.17 |
| 5,060,886 | 10/1991 | Davis et al. | 244/17.17 |

*Primary Examiner*—Galen L. Barefoot
*Attorney, Agent, or Firm*—Evenson McKeown Edwards & Lenahan, PLLC

[57] ABSTRACT

A wheel-type landing gear is disclosed for helicopters with fastening measures on the helicopter which permit a receiving of the wheel-type landing gear on the craft at fittings provided for the fastening of skid-type landing gear without any additional support. The possibility of retrofitting and/or backfitting the helicopter is provided. The main wheels are fastened on rocker arms so that the wheel contact point is situated clearly behind the rearward landing gear fittings.

15 Claims, 1 Drawing Sheet

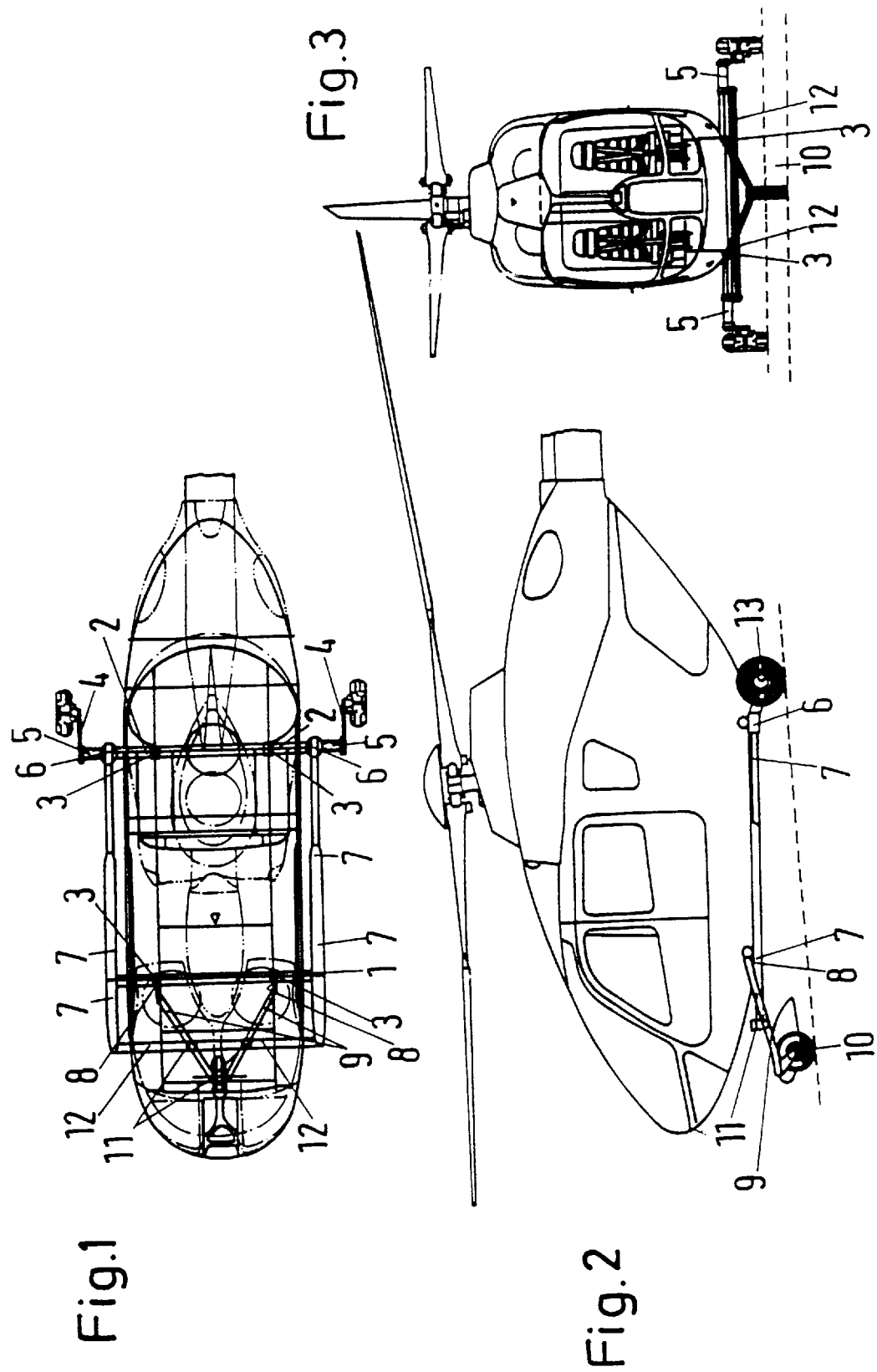

WHEEL-TYPE LANDING GEAR FOR HELICOPTERS

BACKGROUND AND SUMMARY OF THE INVENTION

This application claims the priority of German application P 197 01 404.6-22 filed in Germany on Jan. 17, 1997, the disclosure of which is expressly incorporated by reference herein.

The present invention relates to a wheel-type landing gear for helicopters of the type having skid-type landing gear.

In the case of light helicopters, it is known and customary to use a sled as a landing gear which, for controlling the physical effects inherent to the helicopter, consists of skids and torsion tubes with a defined spring characteristic. This landing gear meets most operating requirements of a light helicopter but has significant disadvantages when the craft is moved on the ground. For improving the handling capabilities of the helicopter on the ground, removable wheels can be attached to the skids. Another possibility consists of providing a fixedly installed wheel-type landing gear which may also be constructed as a retracting landing gear.

However, these solutions have the disadvantage that, on the one hand, the heavy, bulky transport wheels must be available at the site; that is, must be carried along and that, on the other hand, the helicopter must be equipped with a cost-intensive wheel-type landing gear.

It has been implemented on a helicopter design (Bell 412EP) to fasten an undercarriage instead of the skid-type landing gear in the area of the landing gear fittings, in which case several measures must be carried out on the helicopter in order to ensure an additional support of the wheel-type landing gear and in order to provide embarking steps for the cabin crew. In addition, in the case of this known solution, it is required to arrange the main wheels at the level of the rear torsion tube (relative to the longitudinal axis of the helicopter) because otherwise it is not possible to introduce force.

It is an object of the present invention to provide an exchangeable wheel-type landing gear for a light helicopter which can be mounted on its fastening fittings instead of the skid-type landing gear without any special measures, a backfitting being possible at any time.

This object is achieved by providing wheel-type landing gear for helicopters, having fittings for a fastening on the helicopter which permit a receiving of the landing gear on the fittings intended for the fastening of a skid-type landing gear without any additional support of the helicopter, wherein said landing gear has two main wheels which are fastened to two rearward rocker arms which, by way of tube stubs by means of the two ends of a rearward cross tube are rotatably disposed such that the pivots are situated in the axis of the rearward cross tube so that the contact points of the main wheels are situated considerably behind the rearward fastening fittings, and wherein the rearward ends of two elastic embarking steps are fastened on the tube stubs in a torsion-proof manner by way of bearings, forward ends of the embarking steps projecting beyond forward fittings being fastened on the two ends of a cross member on which a rocker arm, which is constructed essentially in a V-shape, is rotatably disposed by means of its ends forming the upper end points of the V, its other end forming a nose wheel bearing and nose wheel.

The wheel-type landing gear further developed according to the invention represents an independent wheel-type landing gear which can be used without any change of the fastening fittings on the helicopter instead of the otherwise customary skid-type landing gear, a backfitting being possible at any time. Because of the further development according to the invention, the wheel-type landing gear has its own embarking step and has a wheel contact point of the main wheels which is clearly arranged behind the rearward cross tube.

This has the important advantage that the wheel-type landing gear according to the invention can be adapted to the respective position of the center of gravity without any change of the basic principle and without changing the fastening fittings on the helicopter, so that the required protection against a tilting beyond the rearward wheel contact point is ensured.

Other objects, advantages and novel features of the present invention will become apparent from the following detailed description of the invention when considered in conjunction with the accompanying drawings.

BRIEF DESCRIPTION OF THE DRAWINGS

FIG. 1 is a bottom view of a light helicopter provided with the wheel-type landing gear according to the invention;

FIG. 2 is a lateral view of the helicopter of FIG. 1; and

FIG. 3 is a front view of the helicopter of FIG. 1.

DETAILED DESCRIPTION OF THE DRAWINGS

The figures, in which identical parts have the same reference numbers, illustrate the wheel-type landing gear further developed according to the invention which has two cross tubes 1 and 2 which extend in parallel with respect to one another and are fastened to the fittings 3 to which the skid-type landing gear of the helicopter is normally fastened. In this case, the rearward cross tube 2 projects laterally so far beyond the exterior edge of the helicopter that the required wheel track is ensured.

One rocker arm 4 respectively is rotatably disposed about the axis of the cross tube on the two ends of the rearward cross tube 2. One wheel bearing respectively with the pertaining main wheel 13 is fastened on the ends of the rocker arms 4 facing away from the rearward cross tube 2. The rocker arms 4 are guided on the cross tube 2 by means of one tube butt 5 respectively, in which case each tube butt 5 is, on the one hand, used as a bearing for the pertaining rocker arm 4 and, on the other hand, is clamped in a torsion-proof manner by way of a bearing 6 to the rearward end of an embarking step 7. By way of this clamping, the compressing movement of the rocker arms 4 are transmitted to the elastic, that is, bendable embarking steps 7, which are constructed as springs, and are absorbed by them. The forward ends of the embarking steps 7 project beyond the forward fittings 3 for the fastening of the landing gear and are used as an abutment for the forward cross tube 1. The main wheels 13 may optionally be equipped with a mechanically or hydraulically operable brake.

The forward cross tube 1 also carries an essentially V-shaped rocker arm 9 which is rotatably disposed on holding devices 8, the two upper ends of the V, which are spaced apart, being supported on a cross member 12, while the opposite end of the rocker arm carries the steerable nose wheel 10 which is constructed as a sliding wheel. In this case, the rocker arm 9 is supported on the cross member 12 at an appropriate leverage by way of spring/damper elements 11, such as elastomer elements, the two ends of the cross member 12 being connected with the two forward ends of the embarking steps 7 which project beyond the forward cross tube 1 and thus beyond the forward fittings 3.

By means of the further developments of the exchangeable wheel-type landing gear according to the invention, it is ensured that the reaction forces are supported within the wheel-type landing gear such that they flow into the fittings 3 for fastening the wheel-type landing gear on the helicopter and require neither further supports on the helicopter, nor introduce fixed-end moments into the fastening fittings for the landing gear on the helicopter.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Wheel-type landing gear for helicopters, having fittings for a fastening on the helicopter which permit a receiving of the landing gear on the fittings intended for the fastening of a skid-type landing gear without any additional support of the helicopter, wherein said landing gear has two main wheels which are fastened to two rearward rocker arms which, by way of tube stubs by means of the two ends of a rearward cross tube are rotatably disposed such that the pivots are situated in the axis of the rearward cross tube so that the contact points of the main wheels are situated considerably behind the rearward fastening fittings, and wherein the rearward ends of two elastic embarking steps are fastened on the tube stubs in a torsion-proof manner by way of bearings, forward ends of the embarking steps projecting beyond forward fittings being fastened on the two ends of a cross member on which a rocker arm, which is constructed essentially in a V-shape, is rotatably disposed by means of its ends forming the upper end points of the V, its other end forming a nose wheel bearing and nose wheel.

2. Wheel-type landing gear according to claim 1, wherein the rearward rocker arms are provided with a covering.

3. Wheel-type landing gear according to claim 1, wherein the main wheels are provided with a hydraulically or mechanically controlled brake.

4. Wheel-type landing gear according to claim 1, wherein the nose wheel is constructed as a steerable sliding wheel.

5. Wheel-type landing gear according to claim 2, wherein the nose wheel is constructed as a steerable sliding wheel.

6. Wheel-type landing gear according to claim 1, wherein spring/damper elements are provided for cushioning the forward rocker arm for the nose wheel, said spring/damper elements being elastomer elements.

7. Wheel-type landing gear according to claim 2, wherein spring/damper elements are provided for cushioning the forward rocker arm for the nose wheel, said spring/damper elements being elastomer elements.

8. Wheel-type landing gear according to claim 4, wherein spring/damper elements are provided for cushioning the forward rocker arm for the nose wheel, said spring/damper elements being elastomer elements.

9. Wheel-type landing gear according to claim 5, wherein spring/damper elements are provided for cushioning the forward rocker arm for the nose wheel, said spring/damper elements being elastomer elements.

10. An exchangeable wheel-type landing gear for helicopters which have front and rear fittings for detachable fastening of skid-type landing gear, comprising:

a front cross tube fastenable to the front fittings for the skid-type landing gear, a rear cross tube fastenable to the rear fittings for the skid-type landing gear, a pair of rear rocker arms which each have a front end fixed to a respective end of the rear cross tubes and a rear end carrying a main wheel bearing, a pair of main wheels rotatably supported by respective ones of said main wheel bearings, a pair of elastic embarking steps having respective rear ends supported at the rear cross tubes and front ends projecting forwardly beyond the front fittings and fastened to the front cross tube, a front rocker arm connected to the front cross tube and extending forwardly of the front cross tube and carrying a nose wheel bearing, and a nose wheel rotatably supported by the nose wheel bearing.

11. Exchangeable wheel type landing gear according to claim 10, wherein said front rocker arm is V-shaped with spaced apart upper ends supported on the front cross tube.

12. Exchangeable wheel type landing gear according to claim 10, comprising a pair of elastomer spring/damper elements for cushioning the forward rocker arm.

13. Exchangeable wheel type landing gear according to claim 12, wherein said front rocker arm is V-shaped with spaced apart upper ends supported on the front cross tube.

14. Exchangeable wheel type landing gear according to claim 13, comprising a pair of elastomer spring/damper elements for cushioning the forward rocker arm.

15. Exchangeable wheel type landing gear according to claim 13, wherein the nose wheel is constructed as a steerable sliding wheel.

* * * * *

UNITED STATES PATENT AND TRADEMARK OFFICE
CERTIFICATE OF CORRECTION

PATENT NO. : 5,887,820
DATED : March 30, 1999
INVENTOR(S) : Roehrdanz et al.

It is certified that error appears in the above-identified patent and that said Letters Patent is hereby corrected as shown below:

ON THE TITLE PAGE:

Item [73] Assignee:
Daimler-Benz AG, Munich, Germany" should be --[73] Assignee: Eurocopter Deutschland GmbH, Muenchen, Germany--.

Signed and Sealed this

Eleventh Day of July, 2000

Attest:

Q. TODD DICKINSON

*Attesting Officer*     *Director of Patents and Trademarks*